United States Patent
Eschner et al.

(10) Patent No.: US 6,571,237 B1
(45) Date of Patent: May 27, 2003

(54) METHOD, SYSTEM AND A COMPUTER PROGRAM PRODUCT FOR PRODUCING AN OFFER DOCUMENT

(75) Inventors: Reijo Eschner, Jyväskylä (FI); Petri Maaranen, Jyväskylä (FI)

(73) Assignee: OY VSP VirtualSalesPerson Ltd., Jyvaskyla (FI)

(*) Notice: Subject to any disclaimer, the term of this patent is extended or adjusted under 35 U.S.C. 154(b) by 0 days.

(21) Appl. No.: 09/568,565

(22) Filed: May 9, 2000

(30) Foreign Application Priority Data

Aug. 17, 1999 (FI) .............................................. 991739 U

(51) Int. Cl.[7] .............................. G06F 17/30; G06F 7/00
(52) U.S. Cl. ............................... 707/4; 707/10; 705/22; 705/28
(58) Field of Search ....................... 707/3, 4, 10, 104.1; 705/22, 27, 28

(56) References Cited

U.S. PATENT DOCUMENTS 6,185,558 B1 * 2/2001 Bowman et al. ............... 705/37
6,199,099 B1 * 3/2001 Gershman et al. ........... 345/966

* cited by examiner

Primary Examiner—Greta Robinson
Assistant Examiner—Susan Rayyan

(74) Attorney, Agent, or Firm—Ronald Craig Fish; Ronald Craig Fish, A Law Corporation

(57) ABSTRACT

The invention relates to automated methods for creating offers for items to a customer. According to the invention, an automated system queries an user interface of a customer's product catalog database. The user interface can be for example a www (world wide web) server of the customer's internet site, which allows searching for products available at the customer's service. The system queries each item in a set of items, and examines the resulting output from the user interface. Internet commerce sites typically allow a user to enter a query for a product, and then reply with a response document detailing the results of the query, i.e. if the queried product was found, and if any such products are presently available and possibly also in how large numbers. The system receives the response document after each query, and examines the response document to find out, if the response indicates that the customer has the queried product available or not. If the customer has the product available, the system queries for the next item in the set of items, and if not, the item is included in the offer document. The resulting offer document consequently lists only such items, which the customer does not have. If the response document indicates the number of products available, the system can include the queried item in the offer document, if the number is below a predefined threshold. This allows the offer document to list also those products, that are nearly finished. The set of items can be all products being marketed by the company of the salesperson, or a limited subset of the products chosen to suit the needs of the customer.

16 Claims, 2 Drawing Sheets

METHOD, SYSTEM AND A COMPUTER PROGRAM PRODUCT FOR PRODUCING AN OFFER DOCUMENT

BACKGROUND OF THE INVENTION

1. Field of the Invention

The invention relates to automated methods for creating offers for items to a customer. Especially, the invention is related to such a method as specified in the preamble of the independent method claim.

2. Description of Related Art

Preparing of offers is a time consuming task for salesmen, who are offering a large selection of products to customer, who stock many different products. In order to produce an efficient offer, the salesman should check which of his products the customer already has and which the customer does not have, and include in the offer only those products which the customer does not have. This checking is a time consuming task, however. For example, a salesman of a publishing company can have hundreds of titles to sell, and his customers such as book shops and libraries can have tens of thousands of titles. The salesman can naturally send an offer to a prospective client listing all his products, but if personnel of the client is required to wade through a long list of products, the effectiveness of the offer can be very low.

Electronic product database systems have been used for a long time, and in some branches of commerce, suppliers and customers have connected their systems in order to automate production of offers and other steps in performing commerce. However, these systems have traditionally been based on custom tailored solutions, whereby they are laborous and costly to implement. These properties have limited the use of these so called EDI (electronic document interchange) systems to high-volume transactions between large corporations.

Many businesses already have electronic commerce sites in the internet, and the significance of e-commerce is increasing rapidly. The internet allows even small businesses to perform electronic commerce. Many conventional shops have launched internet sites for their customers to browse through their product selection and place orders. Despite these developments, good solutions for connecting the systems of different parties in the production—distribution—sales chain over the internet have not been developed.

SUMMARY OF THE INVENTION

An object of the invention is to realize a method and a system for preparing offer documents, which automate a large part of the work performed by a salesman in preparing an offer. A further object of the invention is to realize a method and a system for preparing offer documents, which allow a salesman easily to concentrate on such products in a large selection of products which a customer does not already have.

The objects are reached by automatically querying an user interface of a product database catalog of a customer for each item in a set of items, examining the responses to the queries to find out if the queried item was available, and if the queried item was not available, the item is included in an offer document.

The method according to the invention is characterized by that, which is specified in the characterizing part of the independent method claim. The system according to the invention is characterized by that, which is specified in the characterizing part of the independent claim directed to a system. The computer program product according to the invention is characterized by that, which is specified in the characterizing part of the independent claim directed to a computer program product. The dependent claims describe further advantageous embodiments of the invention.

The invention is based on the basic idea, that a public product database such as a product list or shop interface on a widely available network such as the internet is used of automatically checking, if products in a certain set of products are already present or not. According to the invention, an automated system queries an user interface of a customer's product catalog database. The user interface can be for example a www (world wide web) server of the customer's network site, which allows searching for products available at the customer's service. The system queries each item in a set of items, and examines the results output from the user interface. Electronic commerce sites typically allow a user to enter a query for a product, and then reply with a response document detailing the results of the query, i.e. if the queried product was found, and if any such products are presently available and possibly also in how large numbers. The system receives the response document after each query, and examines the response document to find out, if the response indicates that the customer has the queried product available or not. If the customer has the product available, the system queries for the next item in the set of items, and if not, the item is included in the offer document. The resulting offer document consequently lists only such items, which the customer does not have. If the response document indicates the number of products available, the system can include the queried item in the offer document, if the number is below a predefined threshold. This allows the offer document to list also those products, that are nearly finished. The set of items can be all products being marketed by the company of the salesperson, or a limited subset of the products chosen to suit the needs of the customer. The system can be implemented in many different ways. For example, the system can be implemented as a server, to which salespersons can make remote connections. The system can also be implemented in a portable computer, whereby the salesperson only needs a connection to the customer's site. The invention can easily be applied in such fields of commerce, in which the products have commonly agreed or known identifying information. The following table lists a few examples of such products in order to illustrate the wide range of fields of commerce in which the invention is applicable:

| Product | Identifying information |
| --- | --- |
| books | name of author, title |
| printed publications | ISBN number |
| CD records | name of artist and title of recording |
| DVD movies | name of movie |
| electronic components | type number |
| brand items | name of brand, type of article of manufacture |
| cars | manufacturer and model |
| spare parts for cars | manufacturer and model of car, spare part identifier |

This table shows only a few examples, and the invention is not limited to any way to use associated with those products.

In addition to use for producing offer documents, the inventive concept can also be used for example for collecting market information about other companies. For example, a company can use the inventive system for automatically collecting information about the status of product stocks of the competitors of the company.

Such information can be used to monitor the actions of other companies, and for example to monitor the flow of products of other companies.

BRIEF DESCRIPTION OF THE DRAWINGS

Various embodiments of the invention will be described in detail below, by way of example only, with reference to the accompanying drawings, of which

Same reference numerals are used for similar entities in the figures.

DETAILED DESCRIPTION OF THE PREFERRED EMBODIMENTS

Figure 1:
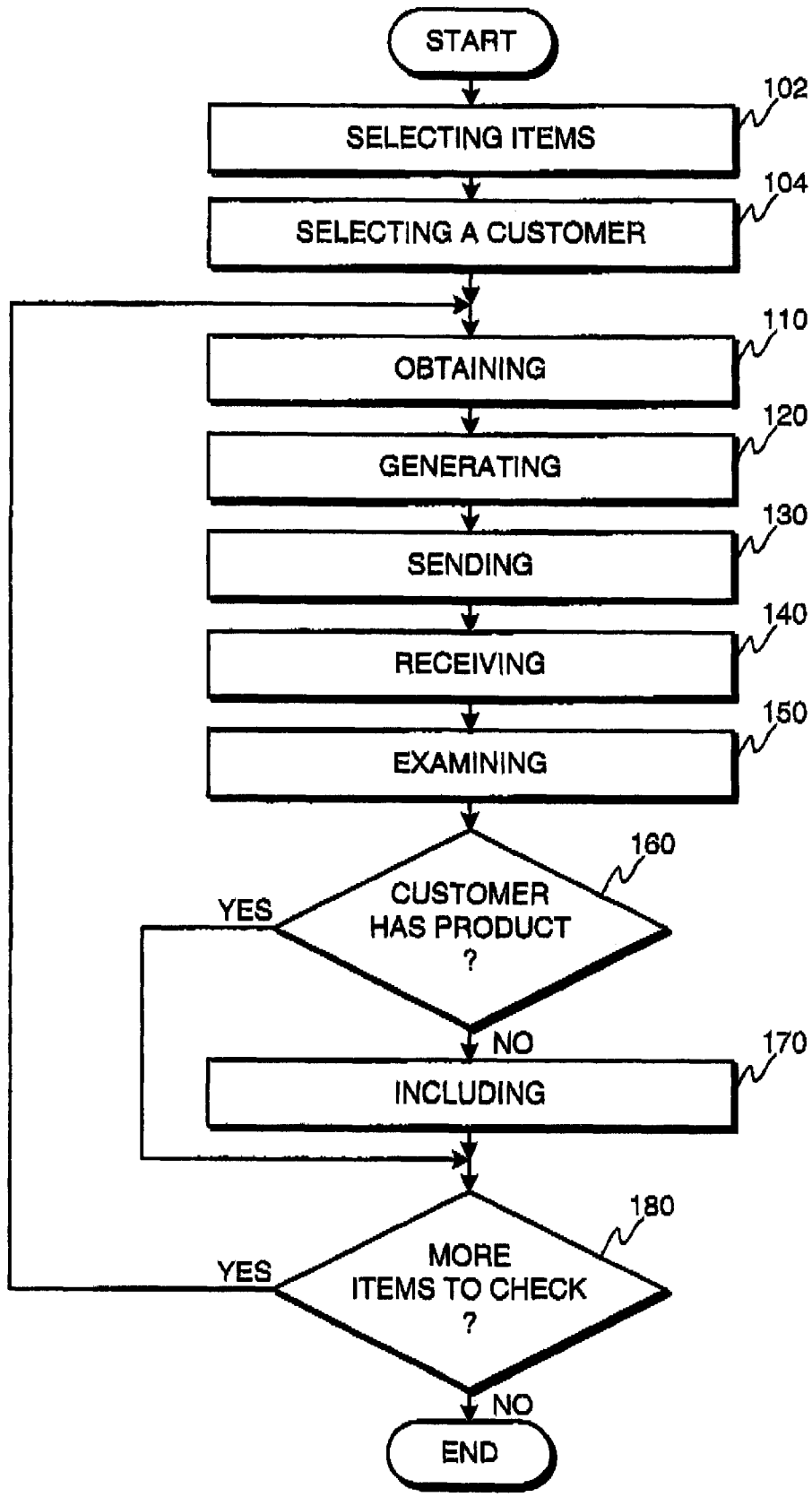
FIG. 1 illustrates various method steps according to various advantageous embodiments of the invention.

According to a first aspect of the invention, a method for producing an offer document for a plurality of items to a customer is provided. FIG. 1 illustrates various steps according to various advantageous embodiments of the invention.

According to an advantageous embodiment of the invention, the method comprises at least the steps of obtaining 110 identifying information of an item of a set of items from a database containing at least identifying information of the items in said set of items, generating 120 a query on the basis of said identifying information, said query being of a form accepted by an interface of a product catalog database of the customer to a data communication network, sending 130 said query over said data communication network to said interface of a product catalog database of the customer, receiving 140 a response from said interface of a product catalog database of the customer, examining 150, 160 said response for finding out, if the customer has said item, and if the customer does not have said item, including 170 said item in the offer document.

The interface of a product catalog database of the customer can be for example the network site of the customer allowing others to make purchases on the site, i.e. the site can be an electronic commerce shop site. Further, the interface can also be for example the catalog of the contents of a public library, allowing the users of the library to check whether a certain book is available from the library. The interface can also be an extranet service of a company, i.e. a service dedicated for a number of business partners of the company, allowing each business partner to have access to certain internal data of the company. If wholesalers or other parties selling items to the company are allowed access to the warehouse inventory system of the company via the network, the inventive method can be used to produce a sales offer for items which the company does not have. In general, the interface of the product catalog database is an interface mainly intended for human users for remote access to the catalog database. In other words, the inventive system emulates human users towards the product catalog interface.

In said step 120, the query sent to the interface is advantageously similar in form as such a query, which results when a user accesses the interface using a browser program. Therefore, the interface is able to receive and process the query as any other query from any other user, without any specific arrangements needed at the site for receiving automated queries.

In said step of examining, the response returned by the customers network interface such as the web server is examined for finding out, whether the queried product was available.

If the amount of the queried items currently available can be deduced from the response, the amount an be compared to a predefined limit value for deciding, if the item should be included in the offer, even if a number of the queried items is available. In such a case, the generated offer can indicate, which items being offered are not available at all at the customer's service, and which items are near to being sold out and due to be replenished.

In a further advantageous embodiment of the invention, the steps 110, 120, 130, 140, 150, 160, and 170 are repeated for each item in said set of items.

In a further advantageous embodiment of the invention, the method further comprises at least the step of selecting 102 said set of items from said database on the basis of at least one parameter. The at least one parameter can be for example a product class or a product type, or any other parameter which can be used for selecting products. This is advantageous for example in such a case, in which a salesman represents a publisher having all genres of literature in print, but the prospective customer is a focused bookstore, such as a bookstore having only cook books or science fiction books, in which case there is no sense to offer a selection of gardening books, for example.

In a further advantageous embodiment of the invention, the method further comprises at least the step of selecting 104 the customer from a set of customers. This step is advantageous, if the system performing the checking of the customer product catalog has been configured for several different customers, in which case the salesman can advantageously select the desired customer for checking.

In a further advantageous embodiment of the invention, a human user is emulated towards said interface of a product catalog database of the customer.

Figure 2:
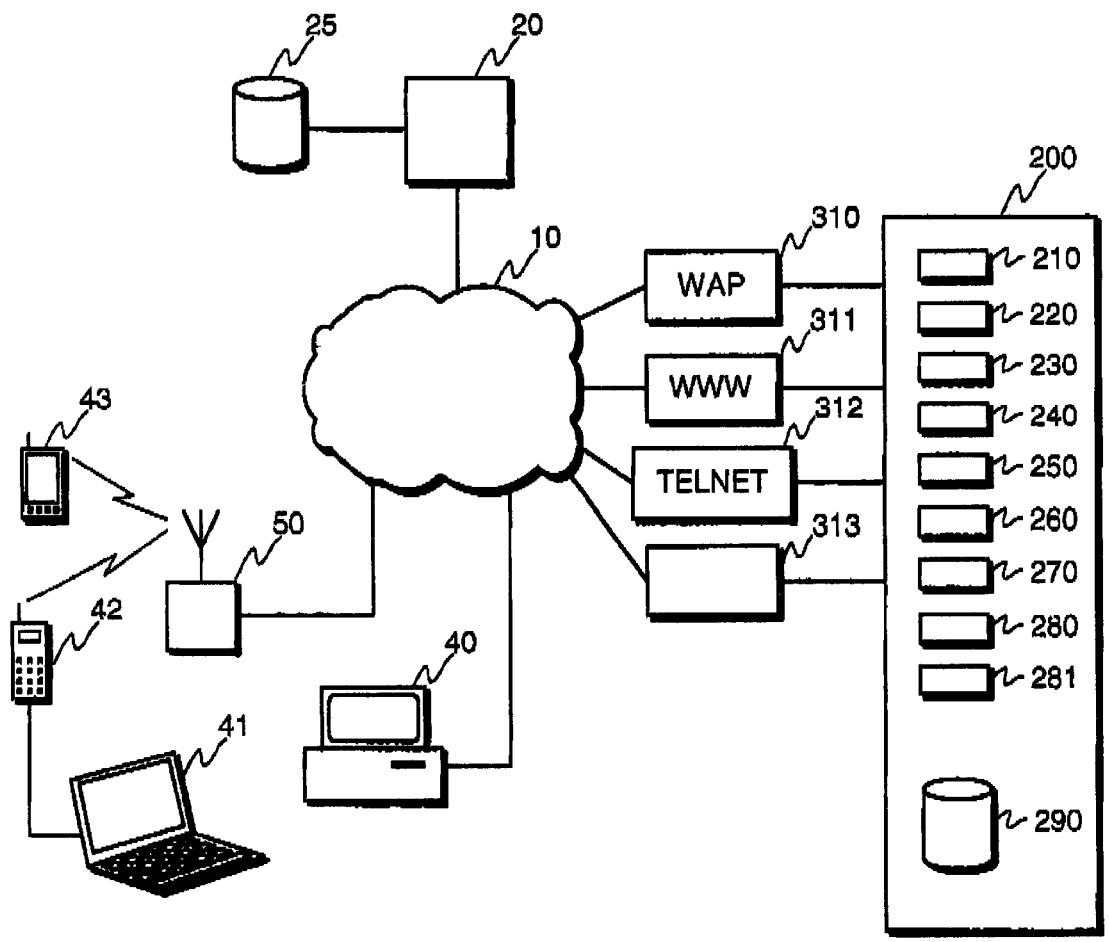
FIG. 2 illustrates a system according to an advantageous embodiment of the invention.

According to a second aspect of the invention, a system for producing an offer document for a plurality of items to a customer is provided. FIG. 2 illustrates various components of an inventive system according to various embodiments of the invention. According to an advantageous embodiment of the invention, the system 200 comprises at least a database 290 for storing at least identifying information of items, means 210 for obtaining identifying information of an item of a set of items from said database, means 220 for generating a query on the basis of said identifying information, said query being of a form accepted by an interface of a product catalog database of the customer to a data communication network, means 230 for sending said query over said data communication network to said interface of a product catalog database of the customer, means 240 for receiving a response from said interface of a product catalog database of the customer, means 250 for examining said response for finding out, if the customer has said item and if the customer does not have said item, for including said item in the offer document.

In a further advantageous embodiment of the invention, the system further comprises at least means 260 for selecting the customer from a set of customers.

In a further advantageous embodiment of the invention, the system further comprises at least means 270 for selecting said set of items from said database on the basis of at least one parameter.

Advantageously, the system can be accessed using many different types of terminals, such as a workstation 40 of a salesman via a data network 10 such as the Internet or a local area network, a portable computer 41 of a salesman for example via a mobile communication means 42 and a mobile communications network 50, or for example a personal digital assistant (PDA) 43 or a WAP-enabled (wireless application protocol) mobile communication means 43. Terminals 41, 42, 43 using wireless services allow the salesmen to easily access the system from remote locations. For example, the PDA 43 or the portable computer 41 can execute browser software for accessing the system.

For allowing remote connections by different types of terminals, the system 200 can advantageously comprise and/or be connected to various protocol interfaces. FIG. 2 shows various examples of such interfaces, such as

- a WAP interface 310 allowing connections by WAP enabled devices, such as mobile phones and personal digital assistants,
- a WWW (world wide web) interface 311 allowing connections by devices capable of executing browser software such as workstations 40 and portable computers 41,
- a telnet interface 312 for plain terminal access, allowing use of the system from locations, where only a low bandwith connection is available, and
- any other interfaces 313.

The system can be connected remotely via many different routes, and the invention is not limited to any specific method of effecting remote communication. The system needs naturally to be connected to a network 10 allowing remote access to the customer's product catalog database system 20, 25. The network 10 can advantageously be the internet, although any other available networks could be used as well. In some advantageous embodiments of the invention the salesmen use the same network 10 to connect to the system 200, as is shown in FIG. 2. However, the salesmen can also use other networks to connect to the system 200, such as the public telephone network, in which case the system 200 needs to be connected to a modem to allow remote communication via the telephone network.

In a further advantageous embodiment of the invention, the system further comprises at least means 280 for receiving information for selection of the customer from a mobile communication means.

In a further advantageous embodiment of the invention, the system further comprises at least means 281 for transmitting information about items included in the offer to a mobile communication means.

FIG. 2 illustrates the system 200 as a separate entity which is accessed remotely by users, such as salesmen. Such a configuration is advantageous regarding the management of the system, i.e. the system can be located at the headquarters of the company where the product information can easily be managed in a centralized fashion. However, the invention is not limited to such configurations. For example, in an advantageous embodiment of the invention, the system is implemented in a portable computer of a salesman, who can then produce offer documents without any connection to his headquarters.

The means 210, 220, 230, 240, 250, 260, 270, 280, and 281 can advantageously be realized using computer software executed by a processor unit of the system 200.

In an advantageous embodiment of the invention, the inventive system comprises means for storing configuration information about different interfaces, the configuration information comprising the address of the part of the interface receiving queries of users, rules for generation of a query of a product, and rules for determining the presence of a product from the contents of a response document.

Since different product catalog interfaces at different network sites often have very different interfaces, the query needed for an interface of a particular customer can be very different from those needed for interfaces of other customers. Consequently, in an advantageous embodiment of the invention, configuration information for each configured interface comprises rules for generation of a query according to requirements of the interface. Generally, the generated query should be similar to queries produced by browser software under control of a human user.

Since the response produced by an interface to a product catalog database is intended for humans to read after processing by displaying software such as web browser software, it is in many cases necessary to manually preconfigure the inventive system to interpret the result and to ignore irrelevant information.

Therefore, each customer site whose properties are predefined in the system may advantageously have an associated set of rules for examining the result document produced by the client site as a response to a query. Such a set of rules can advantageously be constructed experimentally by observing a response document from the interface stating that a certain item is not present, and another response document stating that a certain item is present in the customer's database, and identifying strings of text indicating if the item is present or not. For example, if a search interface displays a document which contains the text "We are sorry, we do not have product xxxxx" in which "xxxxx" stands for the identifying information of the searched item, the presence of the text string "we do not have product" in a response document can be taken as an indication that the product is not present. Since user interfaces are designed for humans to use and not for computers, the layout and contents of response documents are very different in different product catalog interfaces. Therefore, the invention is not limited to any specific set of rules used for determining the outcome of a query.

According to a third aspect of the invention, a computer program product for a system for producing an offer document for a plurality of items to a customer is provided. According to an advantageous embodiment of the invention, the computer program product comprises at least

- computer program code means 210 for obtaining identifying information of an item of a set of items from a database comprising at least identifying information of items,
- computer program code means 220 for generating a query on the basis of said identifying information, said query being of a form accepted by an interface of a product catalog database of the customer to a data communication network,
- computer program code means 230 for sending said query over said data communication network to said interface of a product catalog database of the customer,
- computer program code means 240 for receiving a response from said interface of a product catalog database of the customer, and
- computer program code means 250 for examining said response for finding out, if the customer has said item and if the customer does not have said item, for including said item in the offer document.

According to a further advantageous embodiment of the invention, the computer program product further comprises at least computer program code means 260 for selecting the customer from a set of customers.

According to a further advantageous embodiment of the invention, the computer program product further comprises at least computer program code means 270 for selecting said set of items from said database on the basis of at least one parameter.

According to a further advantageous embodiment of the invention, the computer program product further comprises at least computer program code means 280 for receiving information for selection of the customer from a mobile communication means.

According to a further advantageous embodiment of the invention, the computer program product further comprises at least computer program code means 281 for transmitting information about items included in the offer to a mobile communication means.

The computer program product is typically stored on a computer readable medium. The invention is not limited to the computer program product being stored on any specific type of computer readable medium. The computer program product can be stored on magnetic disks, magneto-optical discs, CD-ROM disks, DVD disks, and in electronic memory means such as in RAM (random access memory) circuits.

In view of the foregoing description it will be evident to a person skilled in the art that various modifications may be made within the scope of the invention. While a preferred embodiment of the invention has been described in detail, it should be apparent that many modifications and variations thereto are possible, all of which fall within the true spirit and scope of the invention.

What is claimed is:

1. Method for automatically producing an offer document for a plurality of items to a customer, comprising at least the steps of
    (1) controlling a computer to obtain identifying information from a database of an item of a set of items available for sale,
    (2) controlling a computer to automatically generate a query to determine if a customer already has the item for which said identifying information was obtained in step 1, and formulating said query on the basis of said identifying information, said query being generated in a form accepted by a computer interface to a data communication network of a product catalog database of said customer,
    (3) controlling a computer to send said query over said data communication network to said interface of a product catalog database of said customer,
    (4) controlling a computer to receive a response from said computer interface of a product catalog database of said customer,
    (5) controlling a computer to examine said response to find out if said customer has said item the identifying information for which was obtained in step 1,
    (6) and if the customer does not have said item, controlling a computer to automatically include said item in the offer document.

2. A method according to claim 1, wherein the steps of claim 1 are repeated for each item in said set of items.

3. A method according to claim 1, further comprising at least the step of selecting the customer from a set of customers.

4. A method according to claim 1, further comprising at least the step of selecting said set of items from said database on the basis of at least one parameter.

5. A method according to claim 1, wherein a human user is emulated towards said interface of a product catalog database of the customer.

6. System for automatically producing an offer document for a plurality of items to a customer, comprising at least
    a database for storing at least identifying information of items available for sale to customers or for any other purpose,
    means for storing configuration information containing rules for generation of a query of a product such that said query is in a form to be accepted by a computer implemented interface of a product catalogue of a customer containing data defining what products said customer has for sale or for any other purpose,
    means for obtaining identifying information of an item of a set of items from said database,
    programmed computer means for automatically generating a query regarding said product the identifying information of which was obtained by said means for obtaining, said query to be sent to said computer implemented interface, said query being based upon said identifying information and formulated in accordance with said rules for generation of a query defined in said configuration information stored in said means for storing so as to be in a form accepted by said computer implemented interface of said product catalog database of said customer,
    programmed computer means for sending said query over a data communication network to said computer implemented interface of a product catalog database of said customer,
    programmed computer means for receiving a response from said computer implemented interface of said product catalog database of said customer,
    programmed computer means for automatically examining said response and determining therefrom if said customer has said item and if said customer does not have said item, for automatically including said item in an offer document.

7. System according to claim 6, further comprising at least means for selecting the customer from a set of customers.

8. System according to claim 6, further comprising at least means for selecting said set of items from said database on the basis of at least one parameter.

9. System according to claim 6, further comprising at least means for receiving information for selection of the customer from a mobile communication means.

10. System according to claim 6, further comprising at least means for transmitting information about items included in the offer to a mobile communication means.

11. Computer program product for a system for producing an offer document for a plurality of items to a customer, comprising at least
    first computer program code means for controlling a computer to obtain from a database identifying information of an item for sale to a customer of a set of items comprising at least identifying information of items,
    second computer program code means for controlling a computer to obtain configuration information containing rules for generation of a query of the product identified by said identifying information obtained by said first computer program code means,
    third computer program code means for controlling a computer to automatically generate a query regarding said product identified by said identifying information obtained by said first computer program code means, said query formulated on the basis of said identifying information and in a form accepted by a computer implemented interface of a product catalog database of said customer, fourth computer program code means for controlling a computer to send said query over a data communication network to said computer implemented interface of said product catalog database of said customer, fifth computer program code means for controlling a computer to receive a response from said interface of a product catalog database of said customer, and sixth computer program code means for controlling a computer to automatically examine said response to determine if said customer has said item and if said customer does not have said item, for controlling said computer to automatically including said item in an offer document.

12. A computer program product according to claim 11 further comprising at least computer program code means for selecting the customer from a set of customers.

13. A computer program product according to claim 11 further comprising at least computer program code means for selecting said set of items from said database on the basis of at least one parameter.

14. A computer program product according to claim 11 further comprising at least computer program code means for receiving information for selection of the customer from a mobile communication means.

15. A computer program product according to claim 11 further comprising at least computer program code means for transmitting information about items included in the offer to a mobile communication means.

16. A computer program product as claimed in claim 11 embodied on a computer readable medium.

\* \* \* \* \*